(12) United States Patent
Bertorelle

(10) Patent No.: US 8,032,106 B2
(45) Date of Patent: Oct. 4, 2011

(54) METHOD FOR SWITCHING A COMPONENT TO AN OPERATION MODE FOR REDUCING POWER CONSUMPTION IN A WIRELESS COMMUNICATION DEVICE

(75) Inventor: Jérôme Bertorelle, Paris (FR)

(73) Assignee: Sequans Communications, Paris la Defense Cedex (FR)

( * ) Notice: Subject to any disclaimer, the term of this patent is extended or adjusted under 35 U.S.C. 154(b) by 723 days.

(21) Appl. No.: 12/168,822

(22) Filed: Jul. 7, 2008

(65) Prior Publication Data

US 2009/0016474 A1    Jan. 15, 2009

(30) Foreign Application Priority Data

Jul. 5, 2007 (EP) .................................. 07290848

(51) Int. Cl.
*H04B 1/40* (2006.01)
(52) U.S. Cl. ...................... 455/343.1; 455/574
(58) Field of Classification Search ............... 455/343.1, 455/343.2, 343.3, 343.4, 574; 370/311
See application file for complete search history.

(56) References Cited

U.S. PATENT DOCUMENTS

| | | | | | |
|---|---|---|---|---|---|
| 529,531 | A | * | 11/1894 | Reeves | 254/376 |
| 4,860,005 | A | * | 8/1989 | DeLuca et al. | 340/7.38 |
| 5,613,235 | A | * | 3/1997 | Kivari et al. | 455/574 |
| 5,845,204 | A | * | 12/1998 | Chapman et al. | 455/343.1 |
| 5,950,120 | A | * | 9/1999 | Gardner et al. | 455/343.1 |
| 5,995,820 | A | * | 11/1999 | Young et al. | 455/343.1 |
| 6,029,061 | A | * | 2/2000 | Kohlschmidt | 455/574 |
| 6,111,927 | A | * | 8/2000 | Sokoler | 375/365 |
| 6,311,081 | B1 | * | 10/2001 | Northcutt et al. | 455/574 |
| 6,453,181 | B1 | * | 9/2002 | Challa et al. | 455/574 |
| 6,473,607 | B1 | * | 10/2002 | Shohara et al. | 455/343.1 |
| 6,650,189 | B1 | * | 11/2003 | Romao | 331/49 |
| 6,873,215 | B2 | * | 3/2005 | Devries et al. | 331/44 |
| 7,218,911 | B2 | * | 5/2007 | Shohara et al. | 455/343.1 |
| 7,421,251 | B2 | * | 9/2008 | Westwick et al. | 455/85 |
| 2007/0105525 | A1 | | 5/2007 | Wang et al. | |

FOREIGN PATENT DOCUMENTS

| | | |
|---|---|---|
| EP | 1168635 | 1/2002 |
| GB | 2368235 | 4/2002 |

OTHER PUBLICATIONS

European Search Report, EP07290848, European Patent Office, The Hague, Dec. 17, 2007.

* cited by examiner

*Primary Examiner* — Blane J Jackson
(74) *Attorney, Agent, or Firm* — Bryan A. Santarelli; Graybeal Jackson LLP

(57) ABSTRACT

An embodiment of a method for switching to an operating mode a device comprising a counter counting the pulses number of a first clock and a date synchronized with an external reference date.
The embodiment comprising at least:
- step A: at a first pulse edge of the first clock, storing corresponding first pulses number and first date synchronized with a first reference date;
- step B: at a second pulse edge of the first clock, storing corresponding second pulses number and second date synchronized with a second reference date;
- step C: computing a frequency error of the first clock by using at least the values stored;
- step D: according to the frequency error, computing a third pulses number; and
- step E: switching the device to the second operating mode at the occurrence of the third pulses number.

16 Claims, 4 Drawing Sheets

METHOD FOR SWITCHING A COMPONENT TO AN OPERATION MODE FOR REDUCING POWER CONSUMPTION IN A WIRELESS COMMUNICATION DEVICE

PRIORITY CLAIM

This application claims priority from European patent application No. 07290848.6, filed Jul. 5, 2007, which is incorporated herein by reference.

TECHNICAL FIELD

An embodiment of the present invention relates to wireless communication systems, and more particularly, to a method for reducing power consumption of a mobile communication device in an OFDM (Orthogonal Frequency division Multiplexing) based communication system.

More precisely, an embodiment of the invention relates to a method for switching at least a component or a function of a wireless communication device operating in a first operating mode, to a second operating mode.

BACKGROUND

Power consumption is typically critical for all mobile devices, among them wireless communication devices. In order to reduce the power consumption, the mobile device can be set to a minimal operating mode, called "idle" mode or "sleep" mode, when the device is not used for voice or data communications. In this minimal operating mode, only a minimal logic is powered and clocked, and most of the components or functions of the device are disabled. During this minimal operating mode, the device checks with (or listens to) a current base station, infrequently and for a short period of time, for pending incoming traffic or for a wake-up order from the current base station. When receiving the wake-up order, some components or functions of the device are switched to an active operating mode, also called "active" mode or "wake-up" mode.

For instance, for a device using WiMAX (Worldwide Interoperability for Microwave Access) technology, when the device is in the idle mode, the device listens to the current base station during a paging listening interval every paging cycle, a paging listening interval lasting usually between two to five frames, preferably two frames. In WiMAX technology, one frame duration is equal to 5 milliseconds (5 ms), and one paging cycle duration (or paging interval) may be equal to 1 second (or 1.5 seconds) or 200 frames, of course the paging cycle duration can be set by the network. Outside of the paging listening interval, the device can shut-down most of its components (or functions) to reduce the power consumption. During the paging listening interval, the network can send a signal to the device to switch the device (or the components or the functions) to the active operating mode in order to handle an incoming call for example. As the device knows the next paging listening interval date, the device can shut-down as many components or functions as possible for the longest possible duration, in order to minimize power consumption. Nevertheless, in order to wake-up some components or functions of the device at a proper time, some minimal logic chip of a base-band chip of the device are kept powered-up and clocked by a low power clock. This low power clock is generally a low precision clock and presents frequency error which may affect the date (or time) to wake-up the components (or functions) of the device. The frequency error is due to several factors like a change in temperature, a change in input current voltage, the aging of the low power clock.

To compensate the frequency error of the low power clock, the U.S. Pat. No. 6,873,215 "Cellular phone terminal and intermittent reception control method to be used in cellular phone terminal", which is incorporated by reference, presents a system using the periods of activity of the device to perform the calibration of the low power clock, by using a local high frequency clock and the low power clock, and by comparing the number of pulses of the low power clock to a theoretical expected number. But this method is not acceptable for the precision requirements of a 4G system for example. As shown in FIG. 1, a controller CTRL receives both a high frequency clock HFC and the low power clock LPC. This controller can turn on or off the high frequency clock HFC and other devices (not shown). The controller also receives environmental information to detect temperature and battery level changes. To calibrate the low power clock, the high frequency clock and the low power clock are running in parallel from a common start date corresponding to the occurrence of a rising edge of the low power clock pulse. The system counts the number of pulses of the high frequency clock and the low power clock, up to another low power clock pulse edge. Because the high frequency clock is asynchronous to the low power clock, the system only starts to count the number of pulses of the high frequency clock on a first pulse edge of the high frequency clock from the start date, as shown in FIGS. 2a and 2b. The time interval duration D between the start date and the end of the counting is estimated from the number $N_F \times T_F$, where $N_F$ is the number of pulses of the high frequency clock and $T_F$ is the duration of a pulse of the high frequency clock. As the clocks are asynchronous, two pulses of the high frequency clock can be missed up (at the start and at the end of the counting). Therefore, if $\epsilon$ is the error on the estimation of the counting time interval duration, the relative error on the estimation of the low power clock frequency is $$\frac{\varepsilon}{N_F T_F},$$

which can be up to $$\frac{2T_F}{N_F T_F} = \frac{2}{N_F}.$$

This can be used to derive how long the calibration needs to be run to have a given accuracy. For example, in a WiBro (Wireless Broadband) based communication system where the clock of the base station runs at 10 MHz, for a 1 ppm (one part per million) accuracy, at least 2 millions cycles of the fast clocks are needed. This takes 0.2 seconds, which is much more than the paging duration for WiMAX, which ranges from 10 to 25 milliseconds. On many paging intervals, the average of the $\epsilon$ error will be about $T_F$. However, this will require many paging intervals, which are separated by 1 to 1.5 seconds typically. Getting the error low is incompatible with a quick calibration, which is necessary when a temperature change is detected for example. The on-going calibration is not compatible with the precision requirement of a 4G system such as WiMAX. Long calibration periods would be needed with these implementations.

Furthermore, it may be necessary to make provision of waking-up the components (or the functions) of the device gradually. For example, a VCTCXO (Voltage Controlled Temperature Compensated Crystal Oscillator) or a TCXO (Temperature Compensated Crystal Oscillator) high frequency clock may need up to several milliseconds to be stabilized, and may need to be woken-up ahead of time to be fully operational when a next paging cycle starts. The existing solutions typically require computing wake-up durations. But as the calibration of the low power clock may not be accurate, an additional error may be introduced in the wake-up date.

SUMMARY

Therefore, there is a need to compensate for the frequency error of the low power clock and to improve the accuracy of the wake-up date of the device, in order to reduce the power consumption of the device, for example by activating the components or the functions of the device as late as possible.

For this purpose, an embodiment of the invention is a method for switching at least a component or a function of a wireless communication device operating in a first operating mode, to a second operating mode, said device comprising at least a first clock, a counter clocked by the first clock and counting the number of pulses of the first clock, and a second clock delivering a date synchronized with a reference date of a third clock external to the device, said method comprising at least the steps of:
  step A: at a first occurrence of a first pulse edge of the first clock, storing a corresponding first pulses number of the first clock and a corresponding first date delivered by the second clock and synchronized with a first reference date of the third clock;
  step B: at a second occurrence of a second pulse edge of the first clock, storing a corresponding second pulses number of the first clock and a corresponding second date delivered by the second clock and synchronized with a second reference date of the third clock;
  step C: computing a frequency error of the first clock by using at least the frequency of the first clock, the first and second pulses numbers, and the first and second dates, or the first and second reference dates;
  step D: according to at least the frequency error, computing at least a third pulses number of the first clock corresponding to a third date at which the component or function will be switched from the first operating mode to the second operating mode; and
  step E: switching the component or the function to the second operating mode at the occurrence of the third pulses number.

In this case, the frequency error of the first clock may be small enough, notably, to support a proper reception of paging information.

As the frequency error of the first clock may be estimated with a high precision, the wake-up accuracy may be improved, and the component or the function of the device may be activated as late as possible, in order to save power consumption.

Some components of the device are for example:
  an external high frequency clock, which may need several milliseconds to stabilize and become usable for demodulation;
  a radio-frequency chip, which may take several hundred micro-seconds to stabilize;
  an internal PLL (Phase Locked Loop), which may take a couple hundred micro-seconds to stabilize;
  an internal high frequency clock, which may only be started after the external high frequency clock and the internal PLL are stable.

The first clock may be a low power clock relative to the second clock, and the second clock may be a high frequency clock.

The component or the function of the device may be disabled or shut-down during the first operating mode, and may be enabled or woken-up during the second operating mode.

The method may also comprise a step C', comprising computing, according to at least the frequency error, a wake-up date of the wireless communication device, a corresponding wake-up pulses number of the first clock, and a corresponding wake-up pulses number of the second clock.

For example, the corresponding wake-up pulses number of the first clock is such that the communication device is completely activated at the wake-up date.

If a plurality of components or functions has to be switched to the second operating mode at different dates, said steps D and E may be performed for each component or function among a plurality of components or functions to be switched from the first operating mode to the second operating mode.

Therefore, the method may comprise different third pulses numbers at which the components or functions will be switched to the second operating mode. A third pulses numbers of a component or function may be different from a third pulses number of another component or function. This allows a plurality of components or functions to be ready at the wake-up date.

The method may comprise a step E' comprising switching the second clock from the first operating mode to the second operating mode at the occurrence of the wake-up pulses number of the first clock.

For example, the first and second occurrences occur at a rising edge of the first pulse edge and the second pulse edge respectively.

The duration between the first occurrence and the second occurrence may be equal to one paging duration.

The first and the second occurrences may occur when the device is woken-up, for example in a paging listening interval.

The counter may be incremented at each pulse of the first clock.

For example, the first and the second dates may be synchronized with the third clock during respectively first and second paging listening intervals, for example during two frames.

The third clock may be a clock of a current base station.

The frequency error of the first clock may be estimated from the relation:

$$E = \frac{C_2 - C_1}{(D_2 - D_1 + E_d) \times F_L}$$

$$E \approx \frac{C_2 - C_1}{(D_2 - D_1) \times F_L}$$

in which:
  $F_L$ is the frequency of the first clock;
  E is the frequency error of the first clock;
  $C_2$ is the second pulses number;
  $C_1$ is the first pulses number;
  $D_2$ is the second date;
  $D_1$ is the first date;
  $E_d$ is duration error between the third base station clock and the second clock, and is negligible for typical small paging durations.

For example, if $E_d$ is negligible, the communication device may be woken-up accurately in order to get the first preamble in the paging listening interval and to decode the corresponding signal. The paging interval duration may be limited to 2 seconds.

For example, if $E_d$ is not negligible, another interval duration holding the beginning of the preamble may be used. Said interval duration is for example greater than the possible maximal error. In this case, the communication device may be woken-up according to a particular resynchronization operating mode. The real receipt date of the preamble may be compared to the internal high frequency clock of the device, and the internal clock may be corrected.

The third pulses number may be estimated from the relations:

$$C_3 = C_2 + \lfloor E \times (D_3 - D_2) \times F_L \rfloor$$

in which:
$C_3$ is the third pulses number,
$C_2$ is the second pulses number,
E is the frequency error of the first clock,
$F_L$ is the frequency of the first clock,
$D_2$ is the second date,
$D_3$ is the third date.

A remaining duration may be estimated from the relation:

$$RD = (D_3 - D_2) - \frac{C_3 - C_2}{E \times F_L}$$

in which:
RD is the remaining duration between the occurrence of the third pulses number and the occurrence of the third date,
$F_L$ is the frequency of the first clock,
E is the frequency error of the first clock,
$D_2$ is the second date,
$D_3$ is the third date,
$C_2$ is the second pulses number,
$C_3$ is the third pulses number, The method may be performed during paging listening intervals, using measures performed during the previous and current intervals to prepare activation for the next interval.

Another embodiment of the invention provides a wireless communication device that implements at least the method described above.

Thus, an embodiment of the proposed solution allows a very accurate re-start mechanism compatible with broadband wireless protocols without needing expensive synchronization with a local oscillator. Because of this, the recalibration of the low power clock may be done systematically during each paging cycle, and not only when environment changes is noticed.

This embodiment may support a wake-up precision based on the mobile high frequency clock instead of the low power clock precision, which is required by new broadband wireless communications standards.

This proposed embodiment may also cover both the small and long paging cycles cases in an optimal way.

The control logic may be pushed into the software, with a powerful but simple hardware support. This enables implementation evolution and changes on already deployed systems, by upgrading the control software.

BRIEF DESCRIPTION OF THE DRAWINGS

Other features and advantages of one or more embodiments of the invention will appear more clearly from the description of an embodiment of the invention made hereinafter, as an indication and by no means restrictive, with reference to the accompanying drawings, wherein.

DETAILED DESCRIPTION

Figure 1:
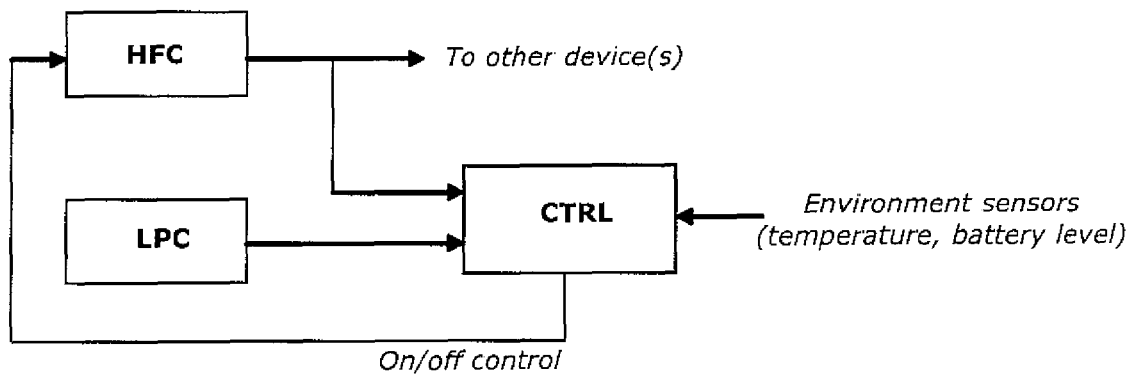
FIG. 1 shows a generic architecture of the prior art, for controlling frequency error in a mobile device.
Figure 2A:
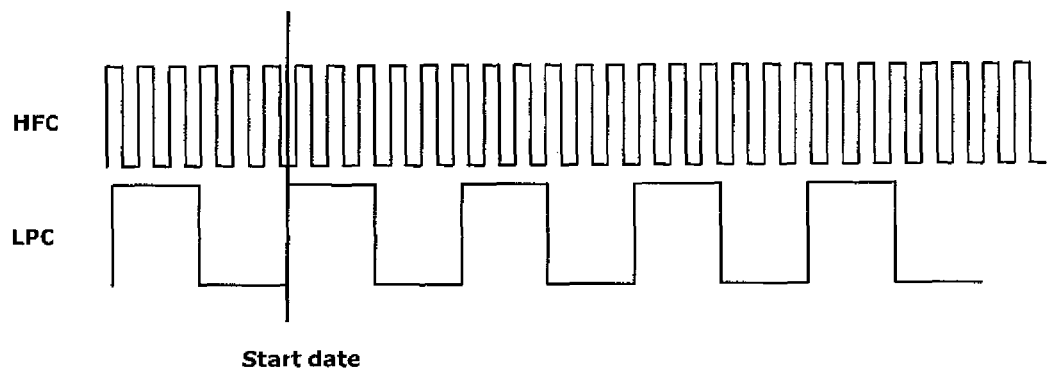
FIGS. 2a and 2b, show the high frequency clock and the low power clock pulses.
Figure 2B:
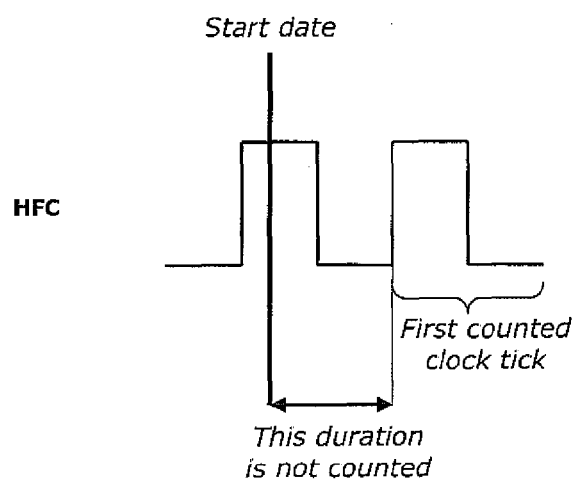
Figure 3:
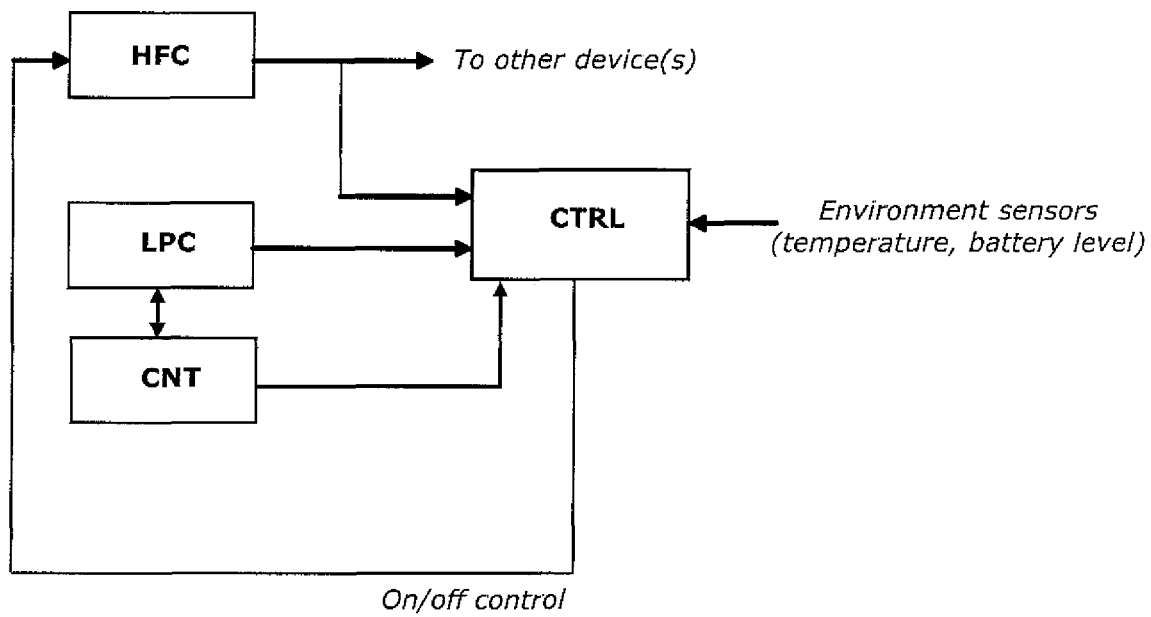
FIG. 3 shows a schematic diagram of a part of the mobile device implementing a method according to one embodiment of the invention.

Referring to FIG. 3, according to one particular embodiment of the invention, a mobile device may comprise a controller CTRL receiving both a first clock LPC and a second clock HFC.

The device may also comprise a free-running counter CNT clocked by the first clock and counting the number of pulses of the first clock. This counter may be incremented at each pulse of the first clock.

The first clock LPC may be a low power clock based on watch quartz which frequency may be equal to 32768 Hz, and may be used to clock a minimal logic of a base band chip of the mobile device when the device is in idle mode.

The controller CTRL can turn on or off second clock HFC and other components or functions (not shown). The controller can also receive environmental information to detect temperature and battery level changes.

In order to save power consumption, the second clock HFC is turned off during idle mode.

When components or functions of the device are in a first operating mode SLEEP/DISABLE, they are disabled or shutdown. When components or functions of the device are in a second operating mode ACTIVE/ENABLE, they are enabled or activated.

The second clock HFC may be a high frequency clock (several megahertz), for example a VCTCXO (Voltage Controlled Temperature Compensated Crystal Oscillator) or a TCXO (Temperature Compensated Crystal Oscillator), used to clock a radio-frequency chip and the base-band chip of the mobile device, and synchronized with a third clock external to the device, for example a clock of a current base station, during and at each paging listening interval. The second clock may deliver a date synchronized with a reference date of the third clock. When the device is active, for example for paging or active operating mode, a local high precision date synchronized with the clock of a current base station is provided be the second clock.

One key to compute the frequency error of the first clock LPC is to match a large number of pulses of the first clock LPC to a reference duration. To estimate this duration, a snapshot mechanism that will capture both the number of pulses counted by the free-running counter and the local high-precision date on, for example, a rising edge of the first clock, is introduced. Using a rising edge allows getting an integer number of pulses of the first clock and minimizing the duration error. By performing for example two captures separated by a sufficient time (typically, by the paging cycle duration), the frequency error of the first clock may be measured accurately.

Figure 4:
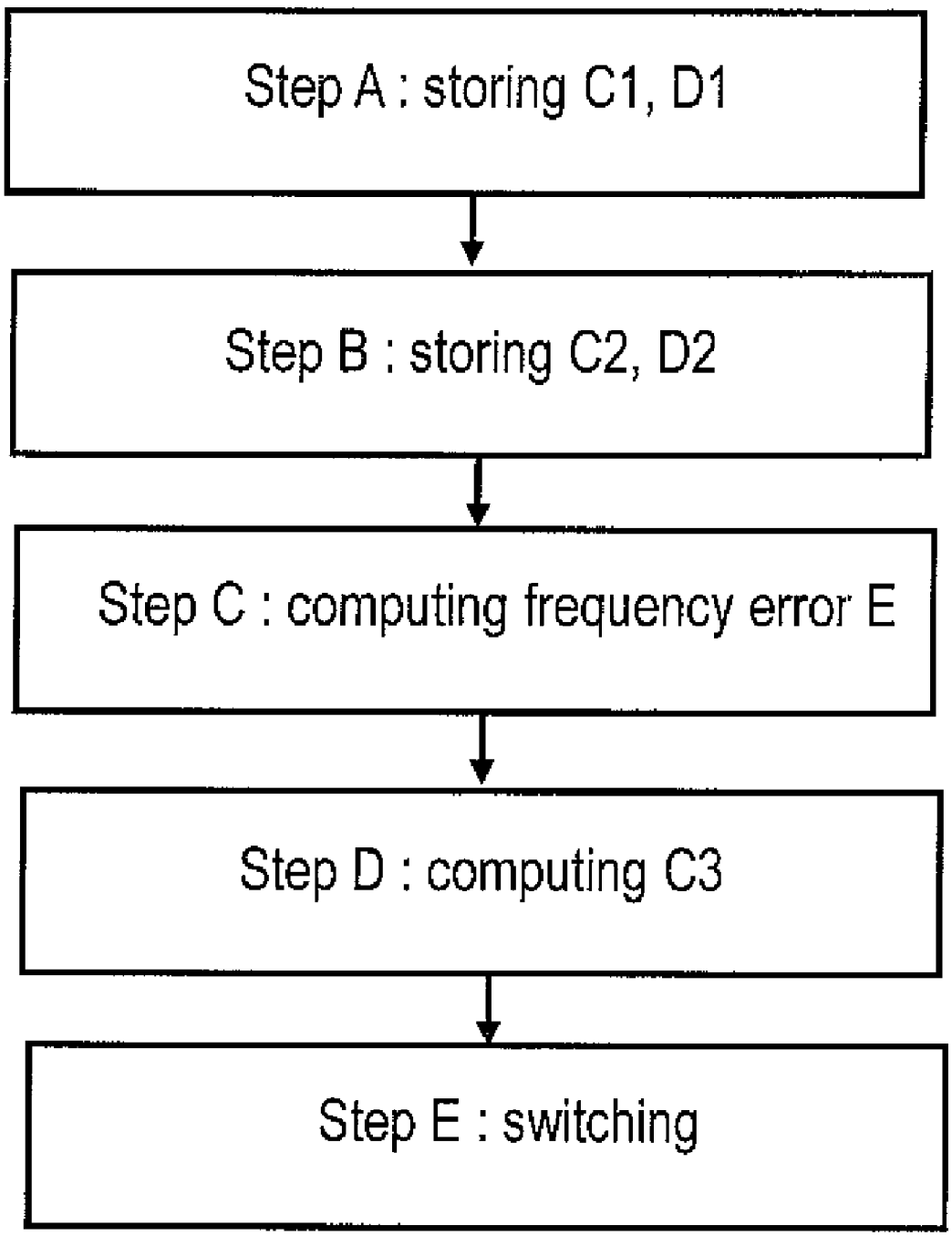
FIG. 4 shows a flowchart of one embodiment of the present invention.

Referring now to FIG. 4, in order to estimate the frequency error of the first clock and to compute an accuracy date to switch at least a component or a function of the device from the first operating mode to the second operating mode, a method according to a particular embodiment of the invention comprises at least the steps of:

- step A: at a first occurrence of a first pulse edge of the first clock, storing a corresponding first pulses number of the first clock and a corresponding first date delivered by the second clock and synchronized with a first reference date of the third clock;
- step B: at a second occurrence of a second pulse edge of the first clock, storing a corresponding second pulses number of the first clock and a corresponding second date delivered by the second clock and synchronized with a second reference date of the third clock;
- step C: computing a frequency error of the first clock by using at least the frequency of the first clock, the first and second pulses numbers, and the first and second dates, or the first and second reference dates;
- step C': according to at least the frequency error, computing a wake-up date of the wireless communication device, a corresponding wake-up pulses number of the first clock, and a corresponding wake-up pulses number of the second clock;
- step D: according to the frequency error, computing at least a third pulses number corresponding to a third date at which the component or function will be switched from the first operating mode to the second operating mode; and
- step E: switching the component or the function to the second operating mode at the occurrence of the third pulses number.

In the case where a plurality of components or functions have to be switched to the second operating mode at different dates, the steps D and E may be performed for each component or function among a plurality of components or functions to be switched from the first operating mode to the second operating mode. This allows a plurality of components or functions to be ready at the wake-up date of the communication device. Each time a third pulses number occurs the corresponding component or function is switched. The second clock is switched from the first operating mode to the second operating mode at the occurrence of the wake-up pulses number of the first clock. Thus, when the wake-up date occurs, the second clock and all the components or functions of the communication device are activated and operational.

Note:

- $C_1$ the first pulses number and $C_2$ the second pulses number, counted by the counter CNT at the two captures at respectively the first and second occurrences, for example on a rising edge of the first clock;
- $B_1$ the first reference date and $B_2$ the second reference date of the clock of the base station associated to respectively the first and second occurrences;
- $D_1$ the first date and $D_2$ the second date generated by the second clock and synchronized to the first and second reference date of the base station clock, and associated with respectively the first and second occurrences; and
- $F_L$ the frequency of the first clock, for example 32768 Hz.

If the first clock (low power clock) were error free, we would have:

$$\frac{C_2 - C_1}{F_L} = B_2 - B_1$$

The frequency relative error E of the first clock to compensate, is actually:

$$E = \frac{C_2 - C_1}{(B_2 - B_1) \times F_L}$$

If E is larger than 1, the counter of the low power clock pulses increases too quickly.

If the device has not access to the base station clock, $B_2 - B_1$ may be estimated from the local first and second dates difference $D_2 - D_1$ with an acceptable error, and the frequency relative error E is estimated from the relations:

$$E = \frac{C_2 - C_1}{(B_2 - B_1) \times F_L}$$
$$= \frac{\Delta C}{\Delta B \times F_L}$$
$$= \frac{\Delta C}{(\Delta D + E_d) \times F_L}$$
$$= \frac{\Delta C}{\Delta D \times F_L} \times \frac{1}{1 + \frac{E_d}{\Delta D}}$$
$$E \approx \frac{\Delta C}{\Delta D \times F_L} \times \left(1 - \frac{E_d}{\Delta D}\right)$$
$$= E' \times \left(1 - \frac{E_d}{\Delta D}\right)$$

where $\Delta C = C_2 - C_1$;
$\Delta B = B_2 - B_1$;
$\Delta D = D_2 - D_1$;
$E' = \frac{\Delta C}{\Delta D \times F_L}$; and $E_d$ is the total error made by using the local first and second dates instead of using the first and second references dates.

For example, for a paging cycle of 1 second and a 38768 Hz low power clock, we have:

$$\frac{\Delta C}{32768} \approx 1 \text{ and } \Delta D \approx 1.$$

The above formula for E shows that by using the local duration measure $\Delta D$ instead of the perfectly accurate duration $\Delta B$, an error below Ed is introduced for a paging duration of 1 second. This error is compatible with the accuracy requirement for demodulation.

In the following section, we will estimate $E_d$.

Figure 5:
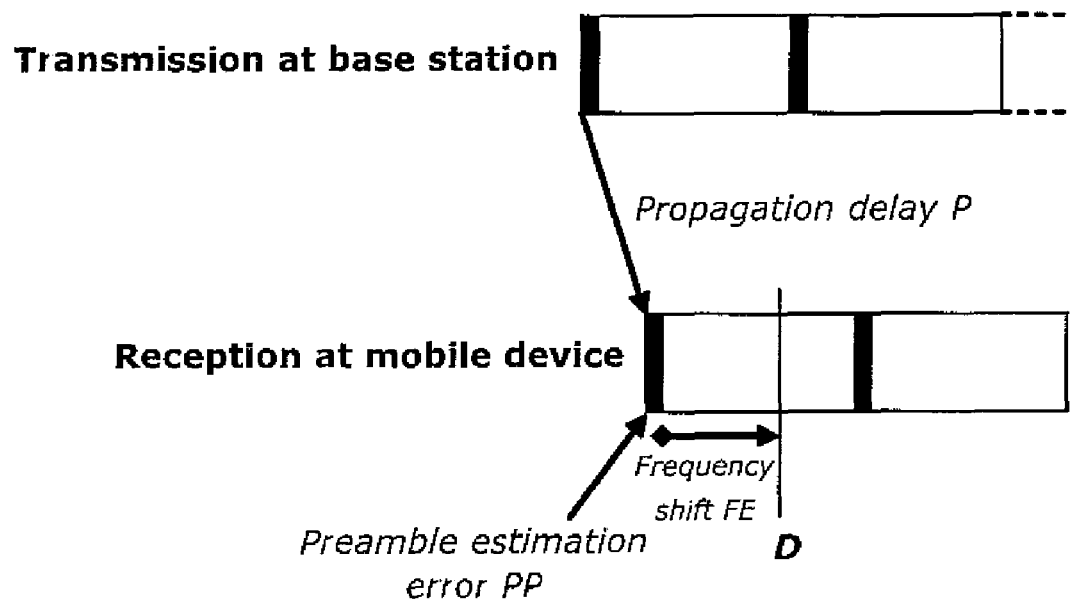
FIG. 5 shows error duration on the reception of frames at the mobile device side.

For a synchronized mobile device, a date error associated to a local date D generated by the second clock, with respect to a reference date B, as shown in FIG. 5, is made of:

- a propagation delay P;
- a preamble (or other beacon) position estimation error PP; and
- a frequency related error FE between D and a previous preamble.

With these notations, at any time:

$B = D + P + PP + FE.$

When dealing with a difference, the error Ed is bounded by:

$$|E_d|=|(B_2-B_1)-(D_2-D_1)| \leq \Delta P + 2\max(PP) + 2\max(FE),$$

where $\Delta P$ is the variation in propagation delay between the two considered dates.

Let's compute an upper bound for Ed and show that it is small enough to enable using the local estimation $D_2-D_1$ to calibrate the low power clock.

First, the propagation variation depends on a maximum mobile speed S and the duration. This gives a maximum distance variation, traveled at nearly the speed of light to give a propagation delay change:

$$\Delta P \leq \frac{S \times (D_2 - D_1)}{c}.$$

WiMAX is designed for a maximum speed of 120 km/h, but even using a higher speed of around 350 km/h (100 m/s) and a duration of 1 second (typical for a paging cycle), we found a propagation delay change well below 0.5 µs.

Second, the local MS reference date is regularly corrected using a beacon signal. For WiMAX, this is a frame preamble. In WiBro example, the synchronization mechanism can detect the preamble with a precision of less than one sample, even for a mobile channel in difficult conditions. Because the transmission date of this beacon is known, the mobile device may compare the theoretical date to its current clock date, and correct the latter. In this WiBro example, with a sample duration of 0.1 µs, we have: $2\max(PP) \leq 2 \times 10^{-7}$ s Lastly, the local high-precision oscillator frequency is synchronized to the base station clock with a high accuracy. For example, a WiMAX system using the WiBro profile must have a worst case frequency error of 200 Hz when operating at 2.3 GHz. This requires a relative error of less than $10^{-7}$. As the time reference is resynchronized every frame, the frequency error can only build up over a single frame. In the WiMAX case with a 5 ms frame duration, we have: $2\max(FE) \leq 2 \times 10^{-7} \times 5 \cdot 10^{-3} = 10^{-9}$ s.

In summary, we can see that even when taking conservative numbers, the total error Ed made by using the local duration estimation is well below 1 µs for a duration of 1 second.

Thus, by using a simple hardware snapshot mechanism, we have shown that it is possible to estimate the frequency error of the low power clock with a high precision. This estimation can then be used to compensate for the frequency error, in order to improve the wake-up accuracy. Because this can be done under software control, there are various ways to perform this. We will show, as a non limitative example of embodiment, a simplest case here. More filtering can be done on the measured error for example.

Let's assume that we have made two snapshots as explained before, during a previous and a current paging interval. We want to compute at which pulses number of the low power clock we need to wake-up the component or function of the device to be ready just before a third date $D_3$ in the future. If the low power clock were perfect, a third pulses $C_3$ number would be:

$$C_3 = C_2 + \lfloor (D_3-D_2) \times F_L \rfloor$$

where the difference $D_3-D_2$ is expressed in seconds.

Because the low power clock has an error, the pulse duration is not $1/F_L$ but $1/(E \times F_L)$. This can be approximated by $1/(E' \times F_L)$ with an error of better than $10^{-6}$ as shown above. The third pulses number will actually be:

$$C_3 = C_2 + \lfloor E' \times (D_3 - D_2) \times 32768 \rfloor$$

$$C_3 = C_2 + \left\lfloor \frac{C_2 - C_1}{(D_2 - D_1) \times 32768} \times (D_3 - D_2) \times 32768 \right\rfloor$$

$$C_3 = C_2 + \left\lfloor \frac{C_2 - C_1}{(D_2 - D_1)} \times (D_3 - D_2) \right\rfloor$$

Again, this is the simplest approximation of E' using directly the two previous snapshots, but it is possible to use an estimation based on more samples, or filter the snapshots based on other information like an environment sensor.

Let's also note RD the remaining duration from the third pulses number $C_3$ to the third date $D_3$. RD is less than low power clock pulse duration and is equal to:

$$RD = (D_3 - D_2) - \frac{C_3 - C_2}{E' \times F_L}$$

It is possible to compute several programmable wake-up dates to trigger the early activation of different components or functions of the device if needed.

For example, to control the proper demodulation during the paging interval, an embodiment of the invention allows the device to be fully operational at the date RS of the latest low power clock rising edge before the demodulation starts for the paging interval. An embodiment of the invention may include a programmable register to provide the date RS, to make sure that the high-frequency clock re-starts at a proper time. The date RS may implicitly define the demodulation start. In this case, the reloading of the high frequency clock at date RS is sufficient, as the high-precision date will make sure that new frame starts when the demodulation needs to restart. An embodiment of the invention may also include a register to program the next demodulation start (at the next frame start). This register takes the duration RD expressed in ticks of the high frequency clock.

Thus, an embodiment of the invention allows to re-start the device at the latest date possible, and to re-start the demodulation with a precision of one high-resolution clock tick. The accuracy may be limited by the low power clock error estimation, which may be better than $10^{-6}$ as shown above. For a paging cycle of 1 second, this error may be of 1 µs on a budget of 6.4 µs in a WiBro case. This leaves sufficient margin to compensate for environmental changes over 1 second.

An embodiment of the proposed solution may be optimal and applicable for small paging cycles typical of mobile phone usage, where the mobile device needs to be reachable in a short time, requiring a short paging duration.

For other applications where the mobile device does not need to be reachable in a short time, a longer paging duration may be used to further reduce the power consumption in idle mode. For a paging cycle of 6 or 7 seconds for example, the LPC error estimation as presented would become higher than the required accuracy of 6.4 µs in our WiBro example. A possible method is to wake-up and re-synchronize every couple of seconds using the mechanism presented above. However, as frequent intermediate wake-ups are not optimal in term of power consumption, it is possible, for a paging interval, to wake-up the device one frame earlier to resynchronize and correct its timing error.

Figure 6:
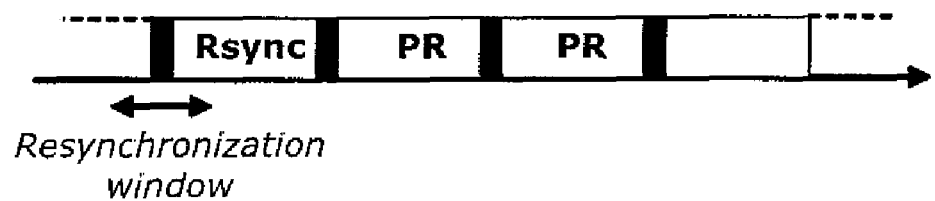
FIG. 6 shows a paging interval of 2 frames with the resynchronization frame.

In the following example, we show a paging interval of 2 frames with the resynchronization frame noted "Rsync", as shown in FIG. 6. When configured for a long paging interval, the device uses the same method according to an embodiment of the invention to restart the high frequency clock, the radio-frequency chip (and possibly other components). But the CPU (central processing unit) is not restarted with the high frequency clock yet. Instead, an extra register allows defining a preamble (or other beacon) search window. If DX is the date of the expected resynchronization frame preamble and PR the paging cycle duration, ϵ=max(E', 1/E'). The preamble may be expected to be seen at a date in the interval [DX−ϵPR, DX+ϵPR]. Additional margin may be taken to protect against environmental changes. This defines a resynchronization or search window [Ds, De] where the preamble will be found. The mechanism described before for a small paging interval is used to make sure that the system is ready at date Ds. But instead of being fully woken-up and start demodulation, most of the digital logic is kept dormant except for a preamble search algorithm that will search the preamble until found or date De is reached. If date De is reached without the preamble being found, the mobile device has dropped from the network. In most cases, the preamble will be found at a date Dp. The resynchronization logic adds the value DX−$D_p$, expressed in the chosen representation, to the high frequency clock to correct the timing error. After this correction, the wake-up hardware will fully re-start the system and perform demodulation at the starting date of the first paging frame or interval. Using this mode, large timing errors may be handled but most of the digital logic is kept dormant until the actual paging interval starts.

Note that the only requirement is that a difference may be computed as a duration in seconds.

Therefore, instead of comparing the low power clock of the device to the local high frequency clock, an embodiment of the invention provides a simple mechanism to compare the low power clock to the base station clock with an acceptable error, the clock synchronization mechanism being required by all recent broadband wireless communication systems.

From the foregoing it will be appreciated that, although specific embodiments of the invention have been described herein for purposes of illustration, various modifications may be made without deviating from the spirit and scope of the invention.

What is claimed is:

1. A method for switching at least a component or a function of a wireless communication device operating in a first operating mode, to a second operating mode, said device comprising at least a first clock (LPC), a counter (CNT) clocked by the first clock and counting the number of pulses of the first clock, and a second clock (HFC) delivering a date synchronized with a reference date of a third clock external to the device,
said method comprising at least the steps of:
step A: at a first occurrence of a first pulse edge of the first clock, storing a corresponding first pulses number of the first clock and a corresponding first date delivered by the second clock and synchronized with a first reference date of the third clock;
step B: at a second occurrence of a second pulse edge of the first clock, storing a corresponding second pulses number of the first clock and a corresponding second date delivered by the second clock and synchronized with a second reference date of the third clock;
step C: computing a frequency error of the first clock by using at least the frequency of the first clock, the first and second pulses numbers, and the first and second dates, or the first and second reference dates;
step D: according to at least the frequency error, computing a third pulses number of the first clock corresponding to a third date at which the component or function will be switched from the first operating mode to the second operating mode; and
step E: switching the component or the function to the second operating mode at the occurrence of the third pulses number.

2. The method according to claim 1, further comprising a step C', including in computing, according to at least the frequency error, a wake-up date of the wireless communication device, a corresponding wake-up pulses number of the first clock, and a corresponding wake-up pulses number of the second clock.

3. The method according to claim 2, wherein for each component or function among a plurality of components or functions to be switched from the first operating mode to the second operating mode, said steps D and E are performed.

4. The method according to claim 2, further comprising a step E' including switching the second clock from the first operating mode to the second operating mode at the occurrence of the wake-up pulses number of the first clock.

5. The method according to claim 1, wherein the first and second occurrences occur at a rising edge of the first pulse edge and the second pulse edge respectively.

6. The method according to claim 1, wherein the first and the second occurrences occur in a paging listening interval.

7. The method according to claim 1, wherein the counter is incremented at each pulse of the first clock.

8. The method according to claim 1, wherein the first and the second dates are synchronized with the third clock during respectively a first and a second paging listening intervals.

9. The method according to claim 1, wherein the first clock is a low power low precision clock relative to the second clock.

10. The method according to claim 1, wherein the third clock is a clock of a current base station.

11. The method according to claim 1, wherein the frequency error of the first clock is estimated from the relation:

$$E = \frac{C_2 - C_1}{(D_2 - D_1) \times F_L}$$

in which:
$F_L$ is the frequency of the first clock;
E is the frequency error of the first clock;
$C_2$ is the second pulses number;
$C_1$ is the first pulses number;
$D_2$ is the second date;
$D_1$ is the first date.

12. The method according to claim 1, wherein if the duration error between the third clock and the second clock is not negligible, it comprises the steps of:
computing an interval duration for preamble searching;
searching a preamble in said interval duration;
comparing the date of reception of the preamble by the device given by the third clock to a date given by the second clock;
adjusting the date of the second clock according to the comparison result.

13. The method according to claim 1, wherein the third pulses number is estimated from the relations:

$$C_3 = C_2 + \lfloor E \times (D_3 - D_2) \times F_L \rfloor$$

in which:
$C_3$ is the third pulses number,
$C_2$ is the second pulses number,
E is the frequency error of the first clock, $F_L$ is the frequency of the first clock,
$D_2$ is the second date,
$D_3$ is the third date.

14. The method according to claim 1, wherein a remaining duration is estimated from the relation:

$$RD = (D_3 - D_2) - \frac{C_3 - C_2}{E \times F_L}$$

in which:

RD is the remaining duration between the occurrence of the third pulses number and the occurrence of the third date,
$F_L$ is the frequency of the first clock,
E is the frequency error of the first clock,
$D_2$ is the second date,
$D_3$ is the third date,
$C_2$ is the second pulses number,
$C_3$ is the third pulses number.

15. The method according to claim 1, wherein said method is performed during paging listening intervals, using measures performed during the previous and current intervals to prepare activation for the next interval.

16. A wireless communication device operable to implement at least the method according to claim 1.

* * * * *